(12) United States Patent
Immonen et al.

(10) Patent No.: US 6,738,361 B1
(45) Date of Patent: May 18, 2004

(54) METHOD, APPARATUS AND COMPUTER PROGRAM FOR IP TRAFFIC PRIORITIZATION IN IP NETWORKS

(75) Inventors: Jukka Immonen, Burlington, MA (US); Jukka Seppälä, Tampere (FI); Juha Ala-Laurila, Tampere (FI)

(73) Assignee: Nokia IP Inc., Mountain View, CA (US)

( * ) Notice: Subject to any disclaimer, the term of this patent is extended or adjusted under 35 U.S.C. 154(b) by 689 days.

(21) Appl. No.: 09/583,281

(22) Filed: May 31, 2000

(51) Int. Cl.[7] .............................................. H04L 12/56
(52) U.S. Cl. ..................................... 370/328; 370/338
(58) Field of Search ................................ 370/352, 353, 370/354, 338, 328, 395.21, 467

(56) References Cited

U.S. PATENT DOCUMENTS

| 5,912,885 A | | 6/1999 | Mitts et al. | |
| 6,452,915 B1 | * | 9/2002 | Jorgensen | ................... 370/338 |
| 6,587,457 B1 | * | 7/2003 | Mikkonen | ................... 370/356 |

FOREIGN PATENT DOCUMENTS

| WO | 9911003 | 3/1999 |
| WO | 0013436 | 3/2000 |

* cited by examiner

*Primary Examiner*—Kenneth Vanderpuye
(74) *Attorney, Agent, or Firm*—Antonelli, Terry, Stout & Kraus, LLP

(57) ABSTRACT

A method, apparatus and computer program for applying a predetermined transmission process to the transmission of IP packets of a particular Internet Protocol (IP) flow in an IP network. The invention is implemented by defining in a host, such as a wireless terminal, a Quality of Service (QoS) management protocol between an IP session management protocol of the host and each of an IP layer and a link layer of the host, and defining in another apparatus, such as a wireless access point, a QoS management protocol between the QoS management protocol of the host and each of an IP layer and a link layer of the wireless access point. The wireless access point communicates with the wireless terminal via a link and allows the wireless terminal to communicate with the IP network. IP session information is configured in the wireless terminal and the wireless access point in each of the IP and link layers based on IP session management information from the IP session management protocol of the wireless terminal. Based on the defined configuration, an IP flow between the wireless terminal and the wireless access point is identified as a particular IP flow. Thereafter, a predetermined transmission process can be applied to the transmission of IP packets of the identified IP flow.

47 Claims, 6 Drawing Sheets

US 6,738,361 B1

METHOD, APPARATUS AND COMPUTER PROGRAM FOR IP TRAFFIC PRIORITIZATION IN IP NETWORKS

BACKGROUND OF THE INVENTION

The present invention relates to a method, apparatus and computer program for applying a predetermined transmission process to the transmission of Internet Protocol (IP) packets of a particular IP flow in an IP network.

The success of Internet Protocol (IP) based networks has created a need for major enhancements in the original best-effort IP service model. In addition to the traditional best-effort applications (email, ftp, etc.) the trend in IP based networks is towards more sophisticated multimedia applications and protocols, including real-time audio and video. In fact, real-time IP applications and protocols already exist, although the current IP standards are not suitable for effectively carrying real-time traffic. To better suit IP based networks for real-time traffic, IP standards are being enhanced with new Quality of Service (QoS) mechanisms. Therefore, it is quite safe to assume that in the near future IP networks will be able to carry different types of traffic over a single packet switched network infrastructure. It can also be assumed that the changes in the IP service model will be reflected in wireless networks, thereby creating a need for development of wireless networks capable of reliably carrying different types of IP applications over the shared radio links.

A conventional IP network 120, as illustrated in FIG. 5, having an IP layer 1201 and a physical layer 1202, interconnects a plurality of hosts 100. FIG. 5 illustrates a representative portion of each host 100. The details of each host 100 are illustrated in FIG. 3. As per FIG. 3 each host 100 includes a RTP layer 1001, an IP session management protocol layer 1002, a UDP layer 1003, a TCP layer 1004, and an IP layer 1005.

As per FIG. 3, if the host 100 is a wireless terminal, then a radio link layer 1011 is provided. Also, as illustrated in FIG. 5, each host 100 can, for example, include a physical layer 1012 which interconnects the host 100 to the IP network 120, via its physical layer 1202. Further, as illustrated in FIG. 3, each host 100 has, for example, Multimedia applications 1006 connected to the RTP layer 1001 and the IP session management protocol layer 1002 via data interface 1007 and a control interface 1008 respectively. Also each host 100 has, for example, legacy applications 1009 connected to the TCP layer via a data interface 1010.

Each host 100 can be any one of a terminal whether wireless or otherwise, a server or any other such apparatus connected to the IP network 120. If the host 100 is a wireless terminal, then a wireless access point is necessary to allow the wireless terminal to communicate with the IP network 120, or any apparatus that operates within IP network 120.

As shown in FIG. 5, IP session management protocols are conducted according to protocols such as H.323, SIP, etc. between hosts so as to setup and release sessions. There is no distinction made between packets that may contain real-time data, or packets that may contain non-real-time data. In the current apparatus, all packets receive best efforts service.

The IP session management protocols currently in use do not depend in any way on the emerging IP-level QoS mechanism. In the currently used IP session management protocols there is no guarantee of available bandwidth or delay experienced by the IP packets. The ideal situation would be to inform the IP and/or link layer QoS mechanisms of the application level IP session in order to provide different priorities for different types of IP sessions. Such a mechanism is particularly important when real-time IP sessions are to be conducted over wireless networks, specifically shared radio links having limited bandwidth.

The problem in transmitting real-time IP traffic over a wireless IP access network is, basically, how to identify and prioritize the IP packets of real-time IP sessions at the IP and radio link layers. In a traditional best-efforts IP packet routing model, all IP packets receive the same treatment despite the type of data the packets are carrying. Thus, the quality of service depends directly on the amount of traffic going through the network. Therefore, when network congestion occurs the quality of service is inevitably poor. To improve the quality of service and to minimize the delay experienced by the IP packets carrying real-time data, some mechanisms for IP packet prioritization are needed.

Since IP is a connectionless network technology, no natural relation between the application level IP sessions and the IP layer routing exists. Thus, there in no standard way to separate IP packets belonging to different IP sessions. Therefore, a mechanism is needed to map the application level IP session management information to QoS capable IP and radio layers.

FIG. 6 illustrates a conventional method of mapping IP QoS control information onto wireless IP transport layers. As shown in FIG. 6, IP applications 200 cause IP communications to be conducted over the IP network between hosts. Particularly, IP communication of IP packets from the IP applications 200 are conducted through IP layer 1003. Further, wireless IP communications of IP packets from the IP applications 200 are conducted through the IP layer 1003 and radio link layer 2001. If the IP communications is control IP packets then such IP communications are conducted through IP session management protocol 1001, wherein control QoS information is transferred between the IP session management protocols 1001 of each of the hosts. In the conventional method of mapping IP QoS information onto wireless IP transport layers there is no standard way to identify IP packets belonging to different types of IP flows. Thus, it is difficult to obtain or set QoS information with respect to different types of IP sessions particularly, wireless IP sessions.

The identification of different types of IP flows, particularly real-time IP flows, is important in wireless IP networks, where limited resources and terminal mobility require effective management of the radio resources. Moreover, there can be several IP session management protocols (H.323, SIP, etc.), which need to be supported in wireless IP networks. It is very difficult to provide a system which offers a QoS interface capable of accommodating all possible IP session management protocols. Various alternative mechanisms have been proposed for identifying different types of IP flows and accommodating different IP session management protocols. However, these alternative mechanisms suffer from various disadvantages.

A first alternative mechanism has been proposed for detecting IP flows by monitoring the IP packet traffic and by applying certain rules to decide that IP packets containing certain header information create an IP flow. The detected IP flows can be given priority over best-effort IP traffic. The problem in this alternative is how to decide on the appropriate QoS for the detected IP flow since no application level signaling information can be used for the decision.

A second alternative mechanism has been proposed for use in third generation (3G) cellular networks where the terminals use Generic Packet Radio System (GPRS) signaling to create PDP contexts to carry IP data. This alternative can be unnecessarily complex for simpler network architectures, such as wireless Local Area Networks (LANs). It is also unclear how well the GPRS protocols are suited for real-time QoS provisioning, since GPRS was originally designed for traditional best-effort IP traffic.

A third alternative mechanism relies on Resource Reservation Protocol (RSVP) signaling that is used for reserving required resources from the IP network. In order to implement this alternative, mapping between the IP session management protocol and the RSVP protocols must be available. This alternative lacks mobility support and probably would require that some modifications be made to the RSVP protocol if applied in wireless IP networks.

A fourth alternative mechanism is disclosed in U.S. Pat. No. 5,912,885 which describes a QoS architecture for wireless Asynchronous Transfer Mode (ATM) networks. In this alternative the concept of an ATM virtual connection is extended over the radio interface. However, although this alternative does support per-user session QoS, it does not address the situation of extending the QoS model so as to be applicable to networks that do not inherently support QoS.

To overcome the above-described disadvantages, a specific QoS interface and QoS management control protocol to identify particular IP flows to which predetermined transmission processes are to be applied applicable to all networks is needed.

SUMMARY OF THE INVENTION

The present invention provides an QoS interworking mechanism for mapping IP session management flow information to underlying. IP and link layers of hosts or other such apparatus in an IP network. It should be noted that the present invention is particularly useful in wireless IP networks, wherein the hosts are wireless terminal which communicate with the IP network via other apparatus such as wireless access points over a radio link. However, the present invention can also be applied to other types of networks. One of the features of the present invention is that after the IP session management information is given to the IP and link layers it is possible to identify particular IP flows (e.g., real-time IP flows) and apply a predetermined transmission process to the transmission of the IP packets of the particular IP flows over the IP and link layers. The link layer could, for example, be a radio-link layer. The above feature of the present invention is achieved by defining a generic QoS interface below the IP session management protocols, that together with a QoS management protocol manage the IP network resources.

Therefor according to the above, the present invention provides a method, apparatus and computer program for applying a predetermined transmission process to the transmission of IP packets of a particular IP flow in an IP network, wherein the IP network is connectable to a wireless terminal acting as a host via a radio link and a wireless access point. The present invention is implemented by defining a QoS management protocol in the wireless terminal between an IP session management protocol and each of IP and link layers of the wireless terminal. Further, the present invention is implemented by defining a QoS management protocol in the wireless access point between the QoS management protocol of the wireless terminal and each of IP and link layers of the wireless access point. IP session information is configured in each of the IP and link layers based on IP session management information from the IP session management protocol of the wireless terminal. As a result of such configuration an IP flow between the wireless terminal and the wireless access point is identified as a particular IP flow. Thereafter, a predetermined transmission process can be applied to the transmission of IP packets of the particular IP flow.

BRIEF DESCRIPTION OF THE DRAWINGS

The scope of the present invention will be apparent from the following detailed description, when taken in conjunction with the accompanying drawings, and such detailed description and specific examples, while indicating example embodiments of the invention, are given by way of illustration only, since various changes and modifications within the spirit and scope of the invention will become apparent to those skilled in the art from this detailed description in which.

DETAILED DESCRIPTION OF THE INVENTION

Figure 1:
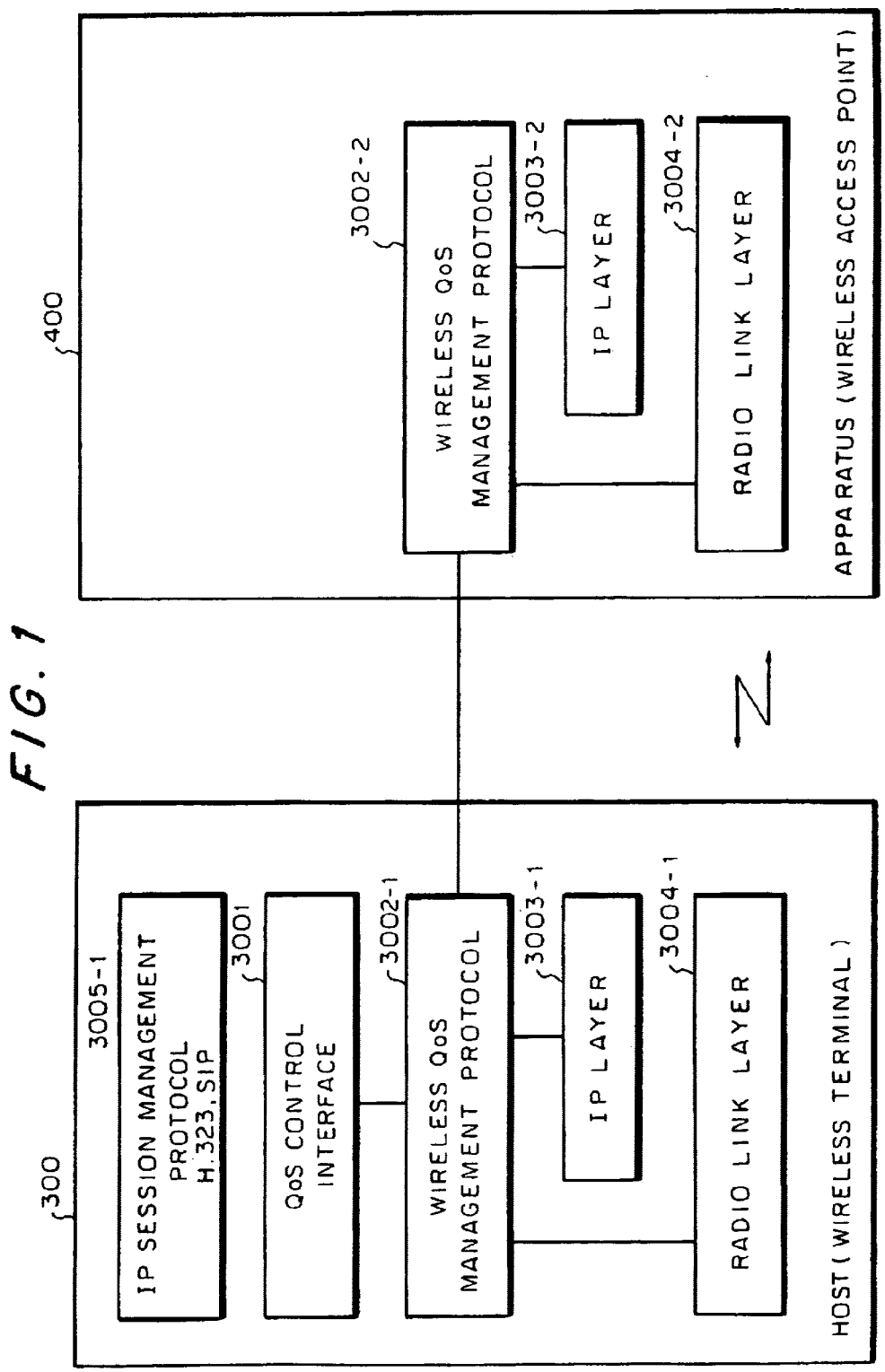
FIG. 1 is a schematic diagram illustrating the QoS interworking mechanism of the present invention.

The features of the present invention will be described with respect to FIGS. 1, 2, 4, 7 and 8. The present invention provides a QoS interworking mechanism for mapping IP session management information to underlying IP and link layers of a host or other such apparatus in an IP network. Although the present invention is particularly useful in wireless IP networks it can also be applied to other types of networks. In this regard, the features of the present invention are illustrated herein as being applied to a wireless IP network having a host acting as a wireless terminal and apparatus acting as a wireless access point which is connected to the IP network. The wireless access point communicates with the wireless terminal via a radio link and allows the wireless terminal to communicate with the IP network. However, the figures are for illustration purposes and are not intended to limit the scope or the application of the present invention.

The basic intent of the present invention is to be able to identify particular IP flows and apply a predetermined transmission process to the transmission of packets of the identified IP flow. The present invention can be implemented by a method, apparatus or computer program. With respect to the computer program, program code or program code sections each including instructions, can be stored on a storage medium in each host or other such apparatus which is described below. The computer program can, for example, be stored in memory and the instructions of the computer program are retrieved from memory and executed by a processor (computer), thereby causing the host or other such apparatus to perform the various functions described below.

In the present invention, a QoS management protocol is defined in a wireless terminal acting as a host between an IP session management protocol and each of IP and link layers of the wireless terminal. Further, in the present invention, a QoS management protocol is defined in a wireless access point acting as such other apparatus between the QoS management protocol of the wireless terminal and each of IP and link layers of the wireless access point. Thereafter, IP session information is configured with respect to each of the IP and link layers based upon the IP session management information from the IP session management protocol so as to identify an IP flow between the wireless terminal and wireless access point as a particular IP flow. Once the IP flow has been identified the predetermined transmission process can be applied to the transmission of IP packets of the identified IP flow.

It should be noted that the QoS management protocol is performed for up-link IP packets (IP packets transmitted from the wireless terminal to wireless access point) by the wireless terminal and for downlink IP packets (IP packets transmitted from the wireless access point to the wireless terminal) by the wireless access point. The wireless terminal initiates session reservations/modifications and the wireless access point is responsible for managing radio resources. Although, details of the features of the present invention as described herein are illustrated in FIGS. 1, 2, 4, 7 and 8 with respect to a wireless IP network, the present invention is not limited to such an embodiment.

As illustrated in FIG. 1, the host can, for example, be a wireless terminal 300 and the other apparatus can, for example, be a wireless access point 400 which is connected to an IP network (not shown). The other apparatus could also, for example, be another host. However, it should be noted that if the other apparatus is another host, then such host would not need to use IP session management protocol and a QoS control interface when communicating with a first host that sets up the session. The details of the QoS control interface is described below.

The features of the present invention are described below with respect to the wireless terminal 300. The features of the wireless terminal 300 can also be found in the wireless access point 400, with the exception of the IP session management protocol layer and a QoS interface, which is disposed between the IP session management protocol layer and a wireless QoS management protocol layer.

The wireless terminal 300 includes a QoS control interface 3001 which serves as an interface between QOS intelligence implemented by wireless QoS management protocol 3002 and IP session management protocol 3005. The QoS control interface 3001 makes it easy to manage and implement the QoS intelligence since the details and specific IP session management protocols can be hidden from various applications.

The wireless terminal 300 and the wireless access point 400 each includes a wireless QoS management protocol (WQMP) 3002 which maps the application level IP session management information to an IP layer 3003 and a radio link layer 3004. Each of the wireless terminal 300 and wireless access point 400 includes an IP layer 3003 and a radio link layer 3004. The IP layer 3003 performs IP packet forwarding with respect to IP packets, and the radio link layer 3004 performs wireless communications between the wireless terminal 300 and the wireless access point 400. Thus, according to the present invention, the WQMP 3002-1 in the wireless terminal 300 configures uplink session information and the WQMP 3002-2 of the wireless access point 400 configures downlink session information.

Figure 7:
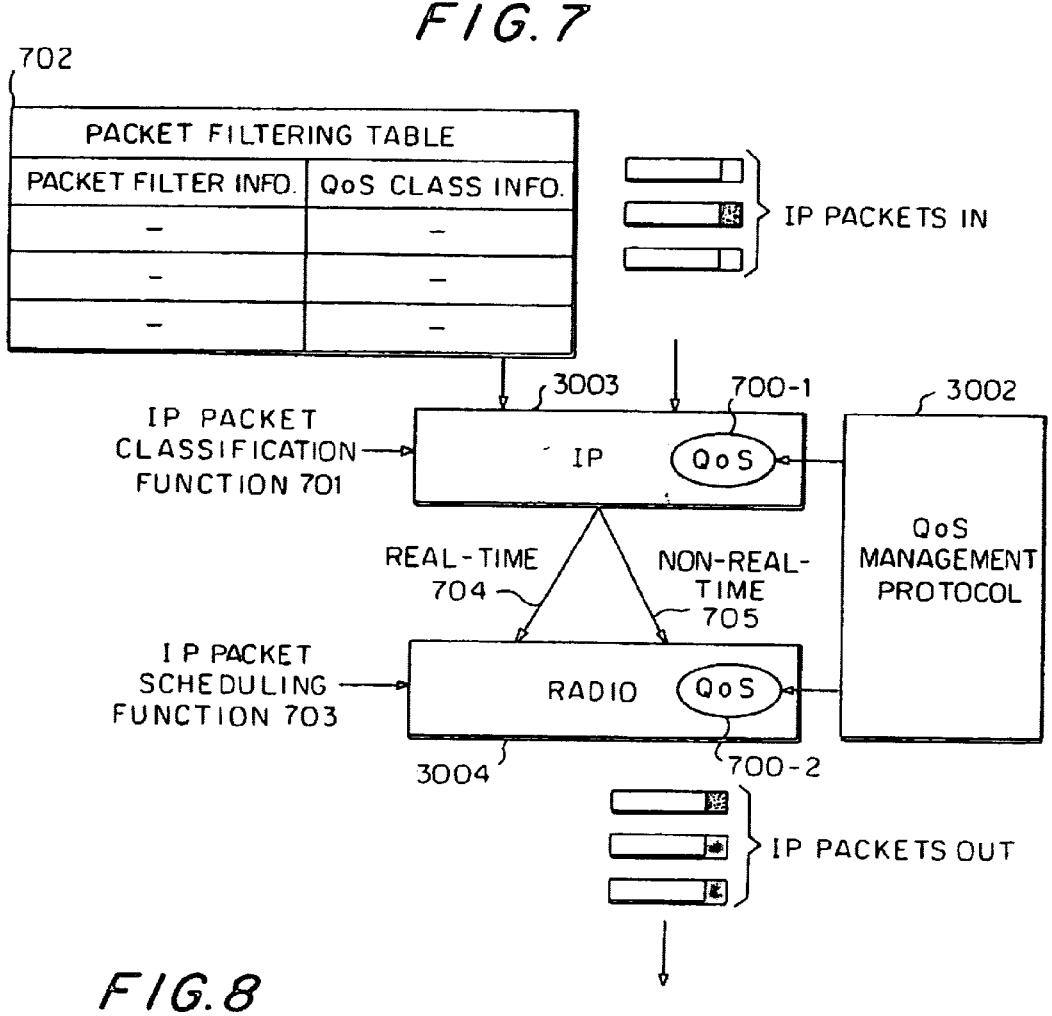
FIG. 7 is a schematic diagram illustrating the functions performed by the IP and link layers with respect to the QoS management protocol.

The WQMP 3002 knows which IP session requires non-default packet handling. As illustrated in FIG. 7, the WQMP 3002 provides a QoS function 700 in each of the IP layer 3003 and the link layer 3004. The QoS function 700 interfaces the WQMP 3002 functions to the functions performed in each of the IP layer 3003 and radio link layer.

The present invention as illustrated in FIG. 7 provides an IP packet classification function 701 in the IP layer 3003 that in combination with a packet filtering table 702 identifies particular types of IP flows to which a predetermined transmission process is to be applied. The packet filtering table 702 stores, in corresponding relation to packet filtering information which identifies a particular IP session, QoS class information that designates a predetermined transmission process (Quality of Service) to be applied to IP packets corresponding to the packet filtering information. The packet filtering table contains IP packet filtering information and corresponding QoS class information for all reserved IP sessions.

The IP packet classification function 701 operating in the IP layer 3003 identifies IP packets of a particular IP session by marking selected IP packets as, for example, either a realtime packet 704 or a non realtime packet 705. The marking, indicating whether the IP packet is a realtime packet or a non-realtime packet, is inserted into each packet depending on whether IP header information of the packet corresponds to packet filtering information contained in the packet filtering table indicating the packet as being a part of a reserved IP session. In other words, an IP flow to which a predetermined transmission process is to be applied. IP identification is performed based on certain IP/UDP/TCP headers fields that uniquely identify certain IP applications.

It should be noted that the IP packet classification function 701 allows for the implementation of static rules for IP packet filtering. Thus, for example, filtering can be done with respect to IP packets containing real-time data. The packet filtering rules are either derived dynamically from the WQMP 3002 or set statically.

The radio link layer 3004 includes an IP packet scheduling function 703 which is responsible for scheduling IP packets according to the markings made by the IP layer 3003. The scheduling mechanism of the IP packet scheduling function 703 depends on the radio access technique. For example, radio link traffic prioritization can be based on the IEEE 802.11 point coordination function (PCF) protocol. Thus, for example, the IP packet scheduling function 703 can send realtime packets first so as to minimize delay for realtime packets.

The WQMP 3002-1 in the wireless terminal 300 through use of the QoS control interface 3001 maps IP session management information from the IP session management protocol 3005 (e.g., session setup, release) to the IP and the radio link layers 3003 and 3004. After this mapping the IP layer 3003 is able to detect the IP packets of particular IP flows which are to receive higher priority (a predetermined transmission process) based on the packet filtering information and the radio link layer 3004 provides such IP packets with a different service (scheduling) over the wireless link according to the QoS class information. For example, the scheduling of the detected IP packets of the particular IP flow can be set for transmission first without delay.

The IP session management protocol 3005 in the wireless terminal 300 includes standard protocols such H.323, SIP, etc. The IP session management protocol 3005 is located on top of the QoS control interface 3001. The WQMP 3002 takes care of allocation and management of the radio resources and controls the IP and radio link layers 3003, 3004 by adding and removing the IP flow information when the flows are created and released. One of the basic requirements of the invention is that the IP and radio link layers 3003 and 3004 are able to provide different priority levels for different types of IP sessions (real-time vs. best effort). Thus, some IP packet classification mechanism is needed at the IP layer 3003. Also some radio link layer prioritization and scheduling mechanism is required at the radio link layer 3004 for uplink QoS since IP layer mechanisms can only control IP sessions inside one terminal. A mechanism for controlling several terminals accessing one wireless access point 400 is located inside the radio link layer 3004 of the wireless access point 400.

Figure 2:
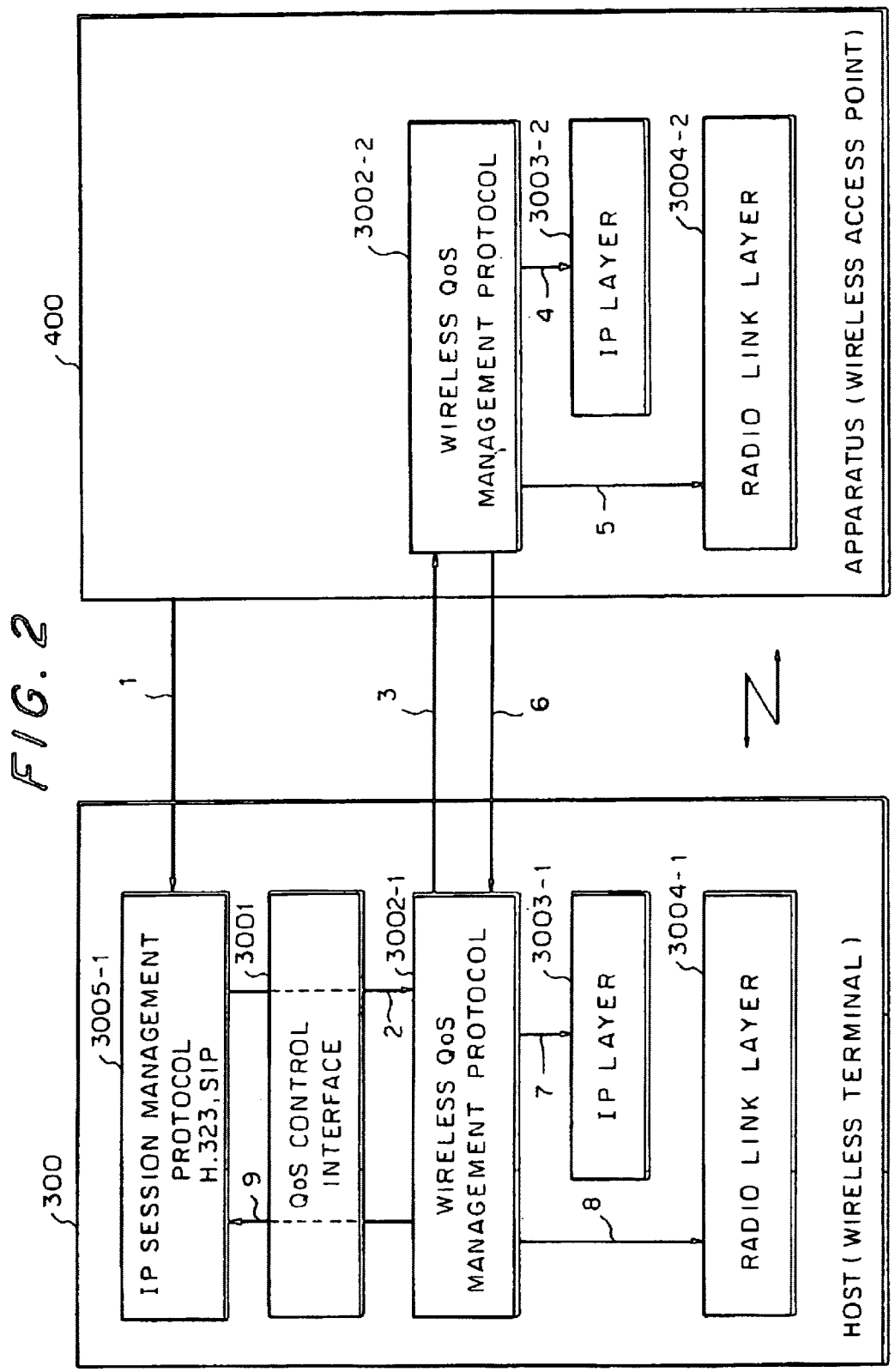
FIG. 2 is a schematic diagram illustrating the steps performed by the QoS interworking mechanism of the present invention.
Figure 3:
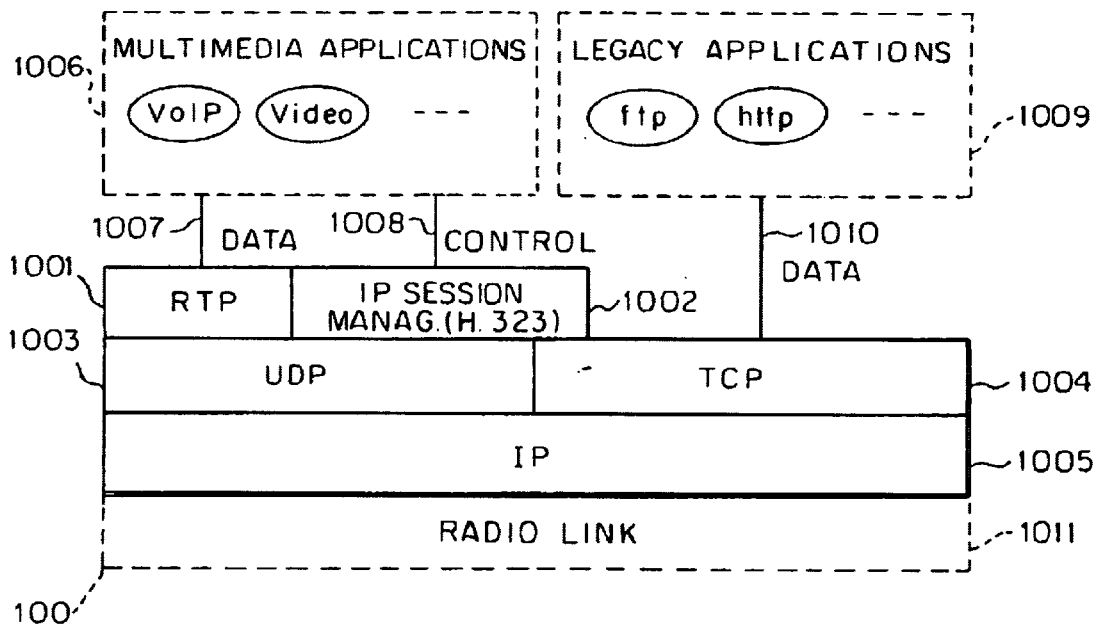
FIG. 3 is a schematic diagram illustrating the architecture of a host acting as a wireless terminal according to the present invention.

FIG. 2 illustrates the interaction between the functional entities of the present invention during an IP session setup. It should be noted that each of the steps described below could, for example, correspond to an instruction, code or code sections of a computer program that when executed causes a computer to perform functions indicated by the steps illustrated in FIG. 2.

In the wireless terminal 300, when the IP session management protocol 3005 receives a setup request from the wireless access point 400 (step 1), the wireless terminal 300 requests the WQMP 3002-1 to check the availability of the radio resources using the functions of the QoS control interface 3001 (step 2). The WQMP 3002-1 forwards the resource reservation request to the WQMP 3002-2 of the wireless access point 400 which controls the resources of one wireless access point 400 (step 3). If the wireless access point 400, through processings performed by the WQMP 3002-2, accepts the resource reservation request, and the session contains downlink data, the WQMP 3002-2 informs the IP layer 3003-2 of the wireless access point 400 of the new accepted IP session by configuring IP flow identification information in the IP layer 3003-2 (step 4). The WQMP 3002-2 also informs the radio link layer 3004-2 of the new IP session with mechanisms appropriate to the radio interface technique used (step 5).

The result of the resource reservation is returned by the WQMP 3002-2 of the wireless access point 400 to the WQMP 3002-1 of the wireless terminal 300 (step 6). In case of a successful reservation, and the session contains uplink data, the WQMP 3002-1 of the wireless terminal 300 informs the IP layer 3003-1 of the new IP session (step 7). Depending on the radio technique in use the WQMP 3002-1 of the wireless terminal 300 may need to inform the radio link layer 3004-1 of the new IP session (step 8). Finally, the WQMP 3002-1 informs the IP session management protocol 3005 of the completion of the resource reservation request via the QoS control interface 3001 (step 9). Accordingly, the wireless terminal 300 acknowledges the resource reservation request and the IP session management protocol 3005 can proceed with the session setup.

After a successful setup, the IP and radio link layers 3003 and 3004 both at the wireless terminal 300 and the wireless access point 400 can identify and prioritize the IP packets belonging to the reserved IP flow. The IP level flow identification is performed according to the IP packet classification function 701 of the IP layer 3003, including a set of IP/UDP/TCP header information fields.

One of the advantages of the present invention is that the QoS control interface 3001 separates the details of IP session management protocols and the wireless QoS management protocol from each other. No changes need to be made in the wireless specific functions even when a new IP session management protocol is introduced. A major advantage is that the proposed QoS interworking mechanism of the present invention does not require any modifications in existing IP applications. They can still use the existing interfaces, including the interface towards the IP session management protocols.

As per the above, a core feature of the present invention is the WQMP 3002. The WQMP 3002 has control interfaces to all of the other elements of the present invention. WQMP 3002 maps the information from IP session management protocol control procedures (session setup/release) to IP and radio link layers with respect to specific QoS information. After this mapping, the IP and radio link layers are able to identify higher priority IP packets and give them better QoS over the wireless link.

Figure 8:
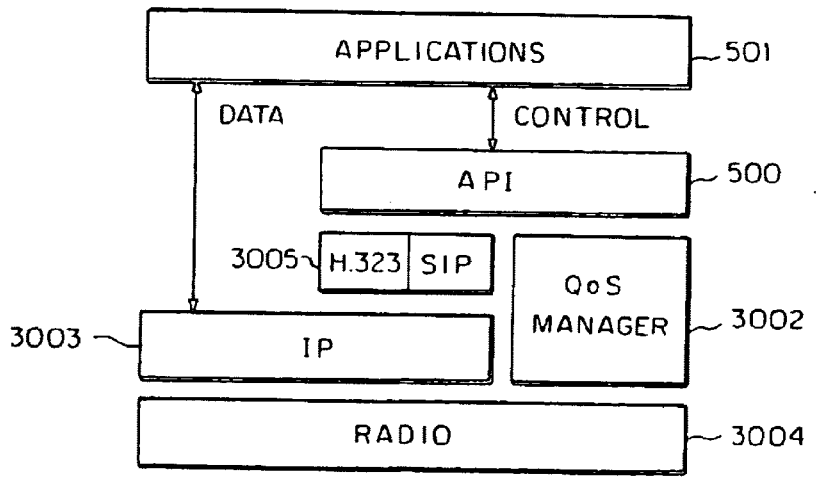
FIG. 8 is a schematic diagram illustrating the architecture of a wireless terminal according to another embodiment of the present invention.

As illustrated in FIG. 8, another embodiment of the present invention is where IP session management protocols and the QoS control interface 3001 are integrated to form an integrated control unit (API) 500 which performs control functions relative to different applications. The API 500 makes it easy to manage and implement the QoS intelligence in wireless IP terminals since the details of the QoS management functions and specific IP session management protocols can be hidden from the applications. This approach makes all other terminal QoS functions needless since the QoS is automatically controlled through the API 500.

Figure 4:
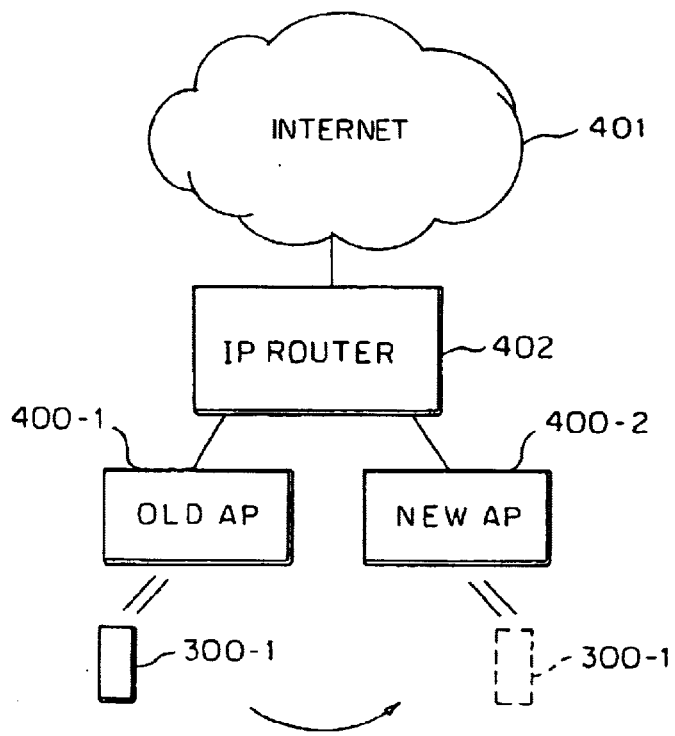
FIG. 4 is a schematic diagram illustrating the steps performed by the QoS interworking mechanism during mobility of a wireless terminal according to the present invention.
Figure 5:
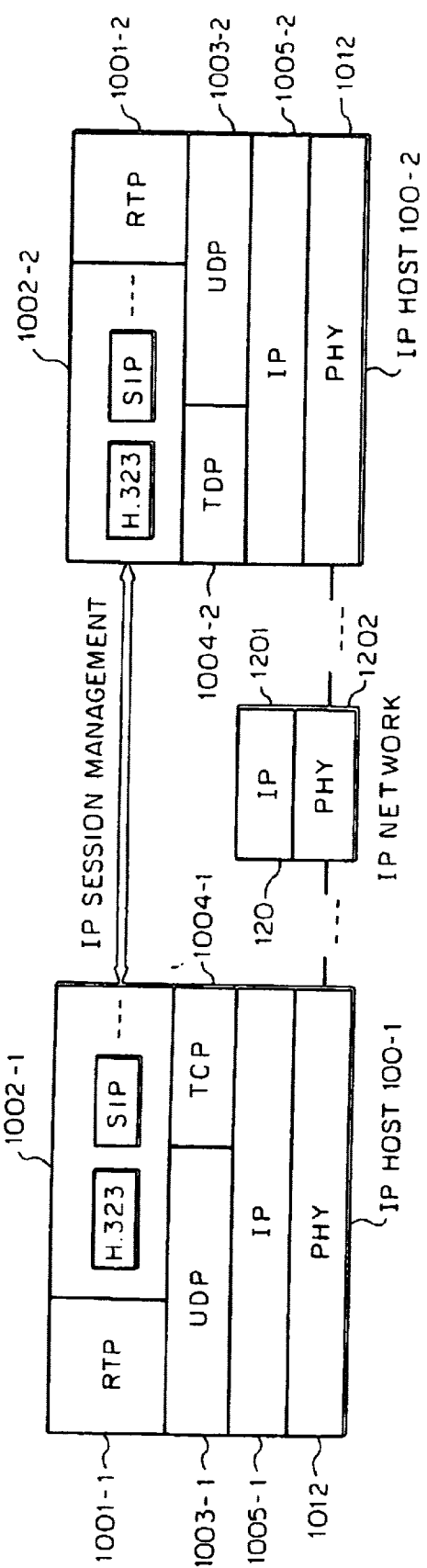
FIG. 5 is a schematic diagram illustrating a conventional IP network model.
Figure 6:
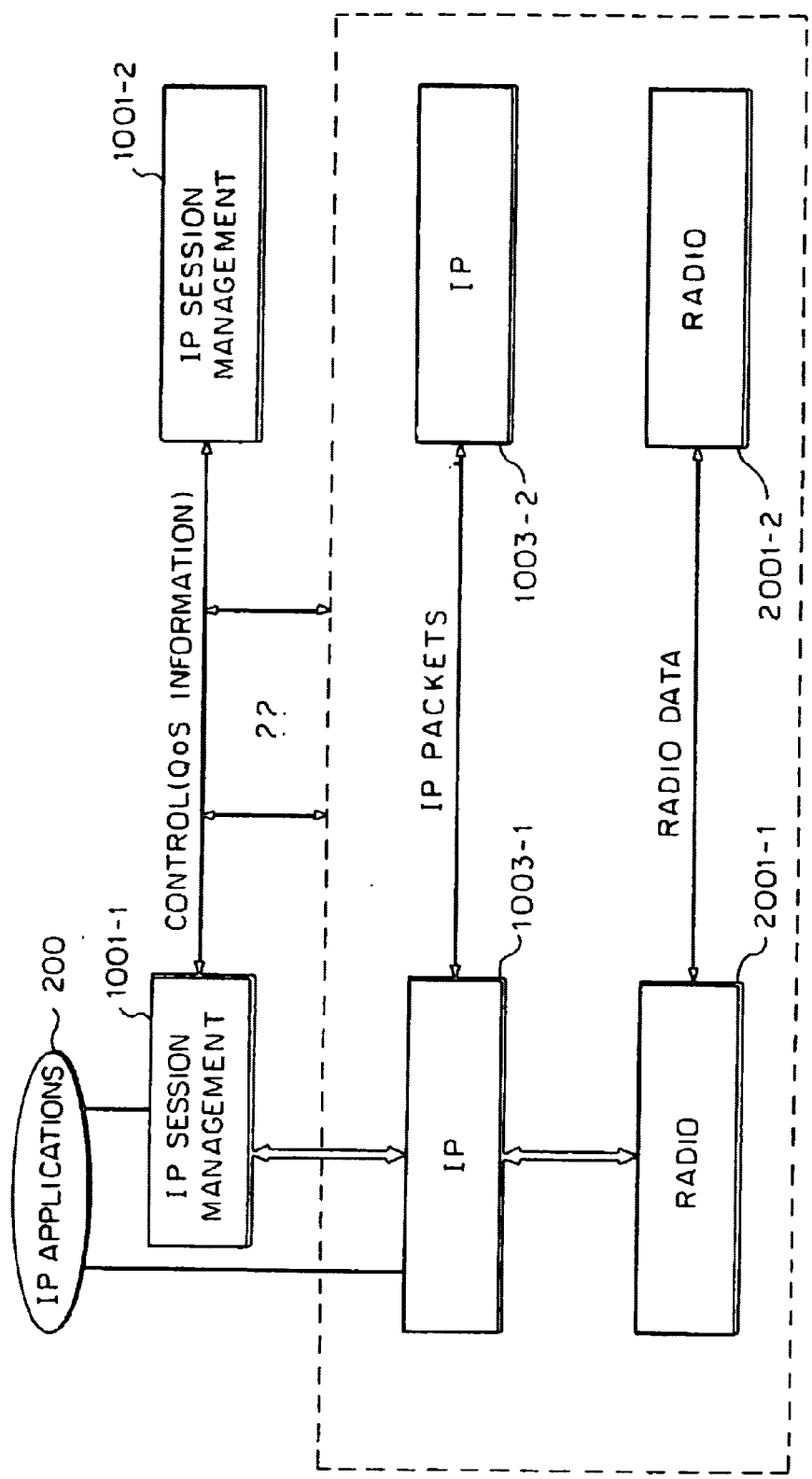
FIG. 6 is a schematic diagram illustrating a conventional mapping of IP QoS control information onto wireless IP transport layers.

The QoS interworking mechanism of the present invention has built-in support for wireless terminal mobility. The WQMP 3002 automatically maintains the resource reservations and flow states when the wireless terminal moves between wireless access points (APs). As illustrated in FIG. 4 the idea is to move the flow reservations from the old AP 400-1 to the new AP 400-2 so that the communicating end-points, namely the wireless terminal 300, do not notice any change in the service quality previously provided by the old AP 400-1. As illustrated in FIG. 4, both the old AP 400-1 and the new AP 400-2 are connected to a packet switched network 401, such as the Internet, through an IP router 402. A wireless terminal 300 communicating with the old AP 400-1 continues its communication via the new AP 400-2 when the wireless terminal 300 moves from a first location serviced by the old AP 400-1 to a new location serviced by the new AP 400-2. Both the wireless terminal 300 and the new AP 400-2 continue to schedule the IP packets according to the original QoS requirements, assuming that the new AP 400-2 has the required radio resources. In case the new AP 400-2 does not have the required radio resources, some IP sessions have to be released during the handover.

The present invention supports two different handover mechanisms: (1) QoS manager controlled, and (2) mobility management controlled. The difference between these two mechanisms is how the existing IP sessions are reserved in the new AP 400-2 during/after the handover.

In the QoS manager controlled case, the wireless terminal 300 has to first re-associate itself with the new AP 400-2, after which the WQMP 3002 of the wireless terminal 300-1 tries to reserve the resources for the existing flows. The handover is thus always a forward type of handover. A forward type of handover means that the wireless terminal 300 first connects to the new AP 400-2, and thereafter reserves the required radio resource. A backward type of handover, on the other hand, means that the existing connections are reserved in the new AP 400-2 before the link to the old AP 400-1 is released.

In the mobility management controlled case, a mobility management function is provided in each of the old AP 400-1 and the new AP 400-2. The mobility management function exchanges IP flow information and, by interfacing to the QoS manager, tries to re-establish the same IP flows in the new AP 400-2. In the case of mobility management controlled handover, backward handover is also possible.

The QoS interworking mechanism of the present invention contains an admission control algorithm. The admission control algorithm according to the present invention decides whether session setup requests are accepted, while a radio resource management function controls the usage of radio resources in a wireless access point.

As per the above, the admission control algorithm is responsible for deciding whether a new session request can be accepted. The admission control algorithm can be freely chosen by the network operator. The decision performed by the admission control algorithm could, for example, be based purely on available radio resources. In other words, the admission control algorithm could include checks to determine whether the wireless access point has enough resources to conduct the requested new IP session. Alternatively, the decision performed by the admission control algorithm could, for example, be based on some type of policy defined in the profile of each user of the IP network. The policy could, for example, define different criteria contained in a particular user profile upon which the decision is to be made. For example, priority could be given to communications being conducted by business users who pay more for service relative to residential users.

The present invention merely defines a generic frame work for the implementation of different types of admission control algorithms. The actual admission control algorithm to be used in the present invention is an operator dependent issue. Therefore, the QoS interworking mechanism of the present invention provides a placeholder for different implementations.

The WQMP 3002-2 of a wireless access point 400 is responsible for controlling usage of radio resources. Each time a wireless terminal 300 requests a new session to be set up, the WQMP 3002-2 of the wireless access point 400 checks if the radio resources currently available are sufficient for the requested session. If the radio resources are sufficient to accommodate the request, then the WQMP 3002-2 reserves resources appropriate for the request. If the radio resources are not sufficient to accommodate the request, the WQMP 3002-2 will deny the request in order to protect the quality of the already accepted (existing) sessions.

Therefore, according to the above, the present invention provides a QoS interworking mechanism for prioritizing IP flows such as real-time IP flows, in wireless IP networks. The QoS interworking mechanism of the present invention operates between the IP session management protocol and the IP and radio link layers of a host. Using the information provided by the IP session management protocol, the QoS interworking mechanism of the present invention dynamically configures the IP session information in the IP and radio link layers of a host. If the host is a wireless terminal, the QoS internetworking mechanism also configures the IP session information in the IP and radio link layers of the wireless access point. After that, the IP packets belonging to the IP session can be identified in a wireless terminal and the wireless access point. A predetermined transmission process can then be applied to the identified IP packets. The predetermined transmission process could, for example, provided priority to the identified IP packets over best-efforts data to meet the strict delay requirements of real-time applications.

The QoS interworking mechanism of the present invention can be applied in different types of wireless IP networks (wireless LANs or cellular IP networks) or for that matter any type of IP network, where IP session management protocols are used for controlling multimedia applications. By defining a QoS control interface according to the present invention the IP applications, such as real-time IP applications, can be identified and given a higher priority in wireless specific network elements. The IP and radio link layers have to contain some QoS mechanisms for prioritizing the IP flows. The present invention does not rely on any specific IP or radio QoS mechanism but rather identifies a generic way to map the IP session management (QoS) information to the IP and radio layers.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A method of applying a predetermined transmission process to transmission of Internet Protocol (IP) packets of a particular IP flow in an IP network, comprising:

defining in a host a Quality of Service (QoS) management protocol between an IP session management protocol of said host and each of an IP layer and a link layer of said host;

configuring in each of said IP and link layers of said host and in each of IP and link layers of another apparatus IP session information based on IP session management information from said IP session management protocol, thereby identifying an IP flow between said host and said another apparatus as being a particular IP flow; and applying the predetermined transmission process to transmission of IP packets of the particular IP flow.

2. A method according to claim 1, further comprising:

defining in said another apparatus a QoS management protocol between said QoS management protocol of said host and each of said IP layer and said link layer of said another apparatus.

3. A method according to claim 2, wherein said host is a wireless terminal and said another apparatus is a wireless access point.

4. A method according to claim 1, wherein said IP layer of said host includes an IP packet classification function which filters IP packets so as to identify IP packets of a particular IP flow to which the predetermined transmission process is to be applied, and wherein said link layer of the host includes an IP packet scheduling function for scheduling transmission of the identified IP packets according to the predetermined transmission process.

5. A method according to claim 2, wherein said IP layer of said host includes an IP packet classification function which filters IP packets so as to identify IP packets of a particular IP flow to which the predetermined transmission process is to be applied, and wherein said link layer includes an IP packet scheduling function for scheduling transmission of the identified IP packets according to the predetermined transmission process.

6. A method according to claim 3, wherein said IP layer of said host includes an IP packet classification function which filters IP packets so as to identify IP packets of a particular IP flow to which the predetermined transmission process is to be applied, and wherein said link layer includes an IP packet scheduling function for scheduling transmission of the identified IP packets according to the predetermined transmission process.

7. A method according to claim 4, wherein said IP packet classification function identifies IP packets of a particular IP flow to which the predetermined transmission process is to be applied by referring to IP packet filtering information stored in an IP packet filtering table.

8. A method according to claim 5, wherein said IP packet classification function identifies IP packets of a particular IP flow to which the predetermined transmission process is to be applied by referring to IP packet filtering information stored in an IP packet filtering table.

9. A method according to claim 6, wherein said IP packet classification function identifies IP packets of a particular IP flow to which the predetermined transmission process is to be applied by referring to IP packet filtering information stored in an IP packet filtering table.

10. A method according to claim 1, further comprising:

defining in said host a QoS control interface between said IP session management protocol and said QoS management protocol so as to separate their respective functions.

11. A method according to claim 2, further comprising:

defining in said host a QoS control interface between said IP session management protocol and said QoS management protocol so as to separate their respective functions.

12. A method according to claim 7, wherein said IP packet scheduling function schedules transmission of the identified IP packets according to QoS class information stored in said IP packet filtering table.

13. A method according to claim 8, wherein said IP packet scheduling function schedules transmission of the identified IP packets according to QoS class information stored in said IP packet filtering table.

14. A method according to claim 9, wherein said IP packet scheduling function schedules transmission of the identified IP packets according to QoS class information stored in said IP packet filtering table.

15. A method according to claim 1, wherein said QoS management protocol and said IP session management protocol of said host are integrated into an integrated control unit specific to a particular application to be executed in said host.

16. A method according to claim 1, wherein said QoS management protocol includes an admission control algorithm which decides whether a request for setting up an IP session to conduct an IP flow over the network is to be accepted.

17. A method according claim 16, wherein the decision performed by the admission control algorithm is based on available resources of a link between said link layer and said another apparatus.

18. A method according to claim 16, wherein the decision performed by said admission control algorithm is based on an admission control policy defined by an operator.

19. A host for use in an Internet Protocol (IP) network being capable of applying a predetermined transmission process to transmission of IP packets of a particular IP flow, said host comprising:

an IP session management protocol for setting up and releasing sessions in the IP network;

an IP layer which performs IP packet forwarding of IP packets from said host;

a link layer which performs transmission of the IP packets from the IP layer over a link to another apparatus connected to said IP network; and a Quality of Service (QoS) management protocol disposed between said IP session management protocol and each of said IP layer and said link layer, wherein said QoS management protocol configures IP session information in each of said IP and link layers of said host and in each of IP and link layers of said another apparatus based on IP session management information from said IP session management protocol so as to identify an IP flow between said host and said another apparatus as being a particular IP flow, and wherein said IP and link layers of said host identify IP packets of a particular IP flow and apply the predetermined process to the identified IP packets.

20. A host according to claim 19, wherein said another apparatus comprises:

a QoS management protocol disposed between said QoS management protocol of said host and each of said IP link layer of said another apparatus.

21. A host according to claim 20, wherein said host is a wireless terminal and said another apparatus is a wireless access point.

22. A host according to claim 19, wherein said IP layer of said host includes an IP packet classification function which filters IP packets so as to identify IP packets of a particular IP flow to which the predetermined transmission is to be applied, and wherein said link layer of said host includes an IP packet scheduling function for scheduling transmission of the identified IP packets according to the predetermined transmission process.

23. A host according to claim 20, wherein said IP layer of said host includes an IP packet classification function which filters IP packets so as to identify IP packets of a particular IP flow to which the predetermined transmission is to be applied, and wherein said link layer of said host includes an IP packet scheduling function for scheduling transmission of the identified IP packets according to the predetermined transmission process.

24. A host according to claim 21, wherein said IP layer of said host includes an IP packet classification function which filters IP packets so as to identify IP packets of a particular IP flow to which the predetermined transmission is to be applied, and wherein said link layer of said host includes an IP packet scheduling function for scheduling transmission of the identified IP packets according to the predetermined transmission process.

25. A host according to claim 22, wherein said IP packet classification function identifies IP packets of a particular IP flow to which the predetermined process is to be applied by referring to IP packet filtering information stored in an IP packet filtering table.

26. A host according to claim 23, wherein said IP packet classification function identifies IP packets of a particular IP flow to which the predetermined process is to be applied by referring to IP packet filtering information stored in an IP packet filtering table.

27. A host according to claim 24, wherein said IP packet classification function identifies IP packets of a particular IP flow to which the predetermined process is to be applied by referring to IP packet filtering information stored in an IP packet filtering table.

28. A host according to claim 19, further comprising:
a QoS control interface disposed between said IP session management protocol and said QoS management protocol so as to separate their respective functions.

29. A host according to claim 20, further comprising:
a QOS control interface disposed between said IP session management protocol and said QoS management protocol so as to separate their respective functions.

30. A host according to claim 25, wherein said IP packet scheduling function schedules transmission of the identified IP packets according to QOS class information stored in said IP packet filtering table.

31. A host according to claims 26, wherein said IP packet scheduling function schedules transmission of the identified IP packets according to QoS class information stored in said IP packet filtering table.

32. A host according to claims 27, wherein said IP packet scheduling function schedules transmission of the identified IP packets according to QoS class information stored in said IP packet filtering table.

33. A host according to claim 19, wherein said QoS management protocol and said IP session management protocol of said host are integrated into an integrated control unit specific to a particular application to be executed in said host.

34. A host according to claim 19, wherein said QoS management protocol includes an admission control algorithm which decides whether a request for setting up an IP session to conduct an IP flow over the network is to be accepted.

35. A host according claim 1, wherein the decision performed by the admission control algorithm is based on available resources of a link between said link layer and said another apparatus.

36. A host according to claim 34, wherein the decision performed by said admission control algorithm is based on an admission control policy defined by an operator.

37. An apparatus, connectable to an Internet Protocol (IP) network, for applying a predetermined transmission process to transmission of IP packets of a particular IP flow, said apparatus comprising:
an IP layer which performs IP packet forwarding of IP packets from said apparatus;
a link layer which performs transmission of the IP packets from the IP layer over a link to a host; and
a Quality of Service (QoS) management protocol coupled to each of said IP layer and said link layer,
wherein said QoS management protocol configures IP session information in each of said IP and link layers based on IP session management information from a QoS management protocol of said host so as to identify an IP flow between said apparatus and said host as being a particular IP flow, and
wherein said IP and link layers identify IP packets of a particular IP flow and apply the predetermined process to the identified IP packets.

38. An apparatus according to claim 37, wherein said host is a wireless terminal and said apparatus is a wireless access point.

39. An apparatus according to claim 37, wherein said IP layer includes an IP packet classification function which filters IP packets so as to identify IP packets of a particular IP flow to which the predetermined transmission is to be applied, and
wherein said link layer includes an IP packet scheduling function for scheduling transmission of the identified IP packets according to the predetermined transmission process.

40. An apparatus according to claim 38, wherein said IP layer includes an IP packet classification function which filters IP packets so as to identify IP packets of a particular IP flow to which the predetermined is to be applied, and
wherein said link layer includes an IP packet scheduling function for scheduling transmission of the identified IP packets according to the predetermined transmission process.

41. An apparatus according to claim 39, wherein said IP packet classification function identifies IP packets of a particular IP flow to which the predetermined process is to be applied by referring to IP packet filtering information stored in an IP packet filtering table.

42. An apparatus according to claim 40, wherein said IP packet classification function identifies IP packets of a particular IP flow to which the predetermined process is to be applied by referring to IP packet filtering information stored in an IP packet filtering table.

43. An apparatus according to claim 41, wherein said IP packet scheduling function schedules transmission of the identified IP packets according to QoS class information stored in said IP packet filtering table.

44. An apparatus according to claim 42, wherein said IP packet scheduling function schedules transmission of the identified IP packets according to QoS class information stored in said IP packet filtering table.

45. An apparatus according to claim 37, wherein said QoS management protocol includes an admission control algorithm which decides whether a request for setting up an IP session to conduct an IP flow over the network is to be accepted.

46. An apparatus according claim 45, wherein the decision performed by the admission control algorithm is based on available resources of a link between said link layer and said another apparatus.

47. An apparatus according to claim 45, wherein the decision performed by said admission control algorithm is based on an admission control policy defined by an operator.

* * * * *